No. 774,128. PATENTED NOV. 1, 1904.
G. H. YAHRAUS.
FARRIER'S ANVIL ATTACHMENT.
APPLICATION FILED APR. 21, 1904.
NO MODEL.
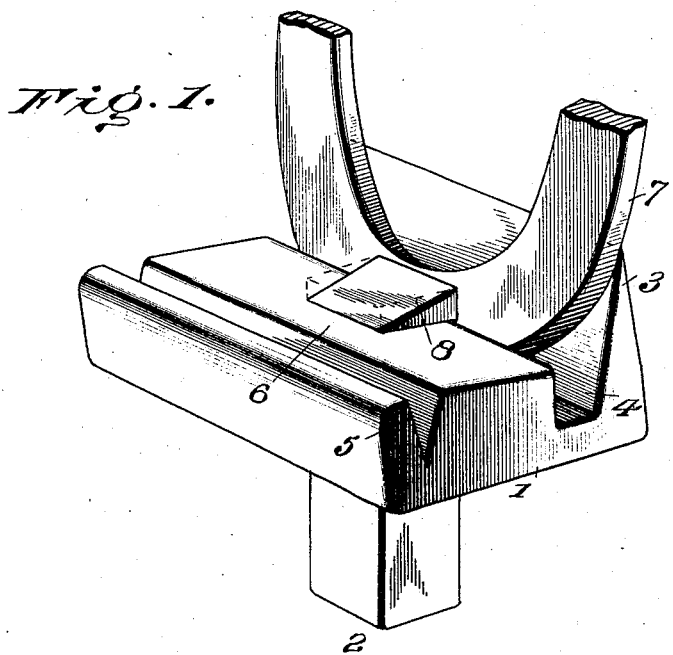
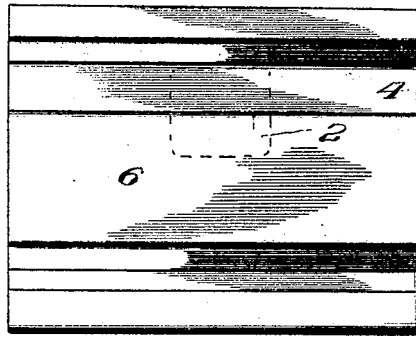
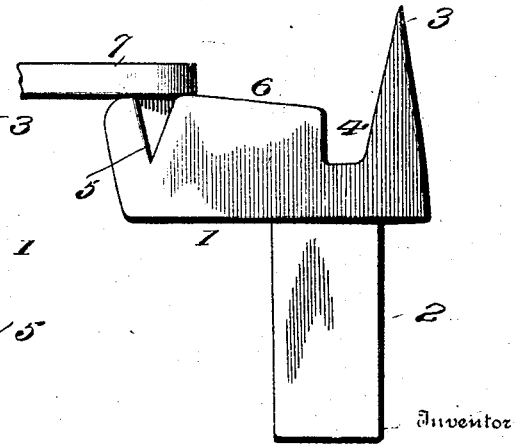
Witnesses
Inventor
George H. Yahraus
By T. H. Tallmadge
Attorney No. 774,128. Patented November 1, 1904.

UNITED STATES PATENT OFFICE.

GEORGE H. YAHRAUS, OF SHELBY, OHIO.

FARRIER'S ANVIL ATTACHMENT.

SPECIFICATION forming part of Letters Patent No. 774,128, dated November 1, 1904.

Application filed April 21, 1904. Serial No. 204,219. (No model.)

*To all whom it may concern:*

Be it known that I, GEORGE H. YAHRAUS, a citizen of the United States, residing at Shelby, in the county of Richland and State of Ohio, have invented certain new and useful Improvements in Farriers' Anvil Attachments; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention provides means to facilitate the work of the smith when preparing horseshoes for attachment to the feet of an animal, especially when it is required to supply the shoes with calks to prevent slipping.

The invention consists of an attachment having a cutter, an inclined face, and parallel grooves, one groove adjacent to the cutter and the other near the opposite edge of the attachment.

The invention consists of the novel features, details of construction, and combinations of parts, which hereinafter will be more particularly set forth, illustrated, and finally claimed.

In the accompanying drawings, forming a part of this specification, Figure 1 is a perspective view of the attachment, showing the manner of sharpening the toe-calk of a horseshoe. Fig. 2 is a top plan view of the attachment. Fig. 3 is a side view of the attachment, showing the manner of welding a sharpened toe-calk to a horseshoe.

Corresponding and like parts are referred to in the following description and indicated in all the views of the drawings by the same reference characters.

The attachment consists of a block 1, having a shank 2, by means of which it is fitted to the usual blacksmith's anvil by inserting the shank in an opening thereof. The block is provided at one edge with a cutter 3 and in its upper face with a groove 4, adjacent to the cutter 3. A groove 5 is formed in the upper face of the block near the opposite edge thereof and is of V form in cross-section to correspond to a tapered or sharpened calk. The face 6 intermediate of the grooves 4 and 5 is inclined toward the groove 4, so as to give the proper inclination to one side of the toe-calk when sharpening the same, as indicated most clearly in Fig. 1. The cutter 3 is used for cutting the ends of horseshoes or cutting bars into determinate lengths or for cutting the bars forming the calks or for other purpose where a cutter is required.

The groove 4 adjacent to the cutter 3 is approximately square and is intended to receive the toe portion of a horseshoe 7 when sharpening the calk 8. The groove 5 is of V form to correspond to a sharpened calk cut from a V-bar, said calk when heated being dropped into the groove 5, which holds the same during the welding of the calk to the shoe 7, as will be readily understood from Fig. 3.

The block 1 and shank 2 are integrally formed, and the elements 3, 6, and 5 are tempered, so as to resist the blows delivered upon the material when working the same.

Having thus described the invention, what is claimed as new is—

In an anvil attachment, a block having a groove in its upper side and having a portion of the face adjacent to and bordering upon one side of the groove inclined with reference thereto, and a cutter projected upward from the block at the opposite side of the said groove, the inner face of the cutter being in the plane of and forming an extension of the adjacent wall of the groove, substantially as described.

In testimony whereof I affix my signature in presence of two witnesses.

GEORGE H. YAHRAUS.

Witnesses:
D. V. BRICKLEY,
S. F. STAMBAUGH.